United States Patent
Nakasuji

[11] Patent Number: 6,059,981
[45] Date of Patent: May 9, 2000

[54] FIDUCIAL MARKS FOR CHARGED-PARTICLE-BEAM EXPOSURE APPARATUS AND METHODS FOR FORMING SAME

[75] Inventor: Mamoru Nakasuji, Yokohama, Japan

[73] Assignee: Nikon Corporation, Tokyo, Japan

[21] Appl. No.: 09/059,610

[22] Filed: Apr. 13, 1998

[30] Foreign Application Priority Data

Apr. 14, 1997 [JP] Japan .................................. 9-095776

[51] Int. Cl.[7] ............................................... C03C 25/06
[52] U.S. Cl. ................................................................ 216/2
[58] Field of Search .................................. 216/2, 41, 84, 216/85, 96, 99; 438/8, 14, 719, 733, 753

[56] References Cited

U.S. PATENT DOCUMENTS

| | | | |
|---|---|---|---|
| 4,836,888 | 6/1989 | Nojiri et al. ............................. | 156/647 |
| 5,168,166 | 12/1992 | Hayakawa et al. .................... | 250/492.2 |
| 5,709,773 | 1/1998 | Field et al. .............................. | 156/647 |
| 5,725,729 | 3/1998 | Grieff ..................................... | 156/657 |
| 5,838,413 | 11/1998 | Matoba et al. .......................... | 349/155 |
| 5,883,012 | 3/1999 | Chiou et al. ............................ | 438/748 |

*Primary Examiner*—Bruce Breneman
*Assistant Examiner*—Alva C Powell
*Attorney, Agent, or Firm*—Klarquist Sparkman Campbell Leigh & Whinston, LLP

[57] ABSTRACT

Methods are disclosed for making fiducial marks for charged-particle-beam (CPB) exposure apparatus, especially for performing high-accuracy measurements of aberrations of the CPB optical system in such apparatus. The fiducial marks are made by forming multiple features in a monocrystalline Si substrate. The features are longitudinally extended and are preferably in two groups wherein the features in one group are longitudinally extended in a direction that is perpendicular to the direction in which the features in the other group are longitudinally extended. Where the (110) plane of the monocrystalline Si is the surface of the substrate, the longitudinal direction of each feature is oriented in the <112> direction of the (110) plane.

22 Claims, 6 Drawing Sheets

FIDUCIAL MARKS FOR CHARGED-PARTICLE-BEAM EXPOSURE APPARATUS AND METHODS FOR FORMING SAME

FIELD OF THE INVENTION

This invention pertains to microlithography, as used for making semiconductor devices and displays, using a charged-particle beam. More specifically, this invention pertains to fiducial (reference) marks used in a charged-particle-beam exposure apparatus for aligning the mask and substrate and for measuring aberrations, and to methods for manufacturing such fiducial marks.

BACKGROUND OF THE INVENTION

Conventional microlithographic exposure apparatus employing a charged-particle beam such as an electron beam comprise a charged-particle-beam (CPB) optical system for directing the charged-particle beam passing through a mask onto the surface of a sensitive substrate such as a semiconductor wafer. Conventional microlithographic exposure apparatus typically comprise any of various measurement subsystems used for making, inter alia, accurate positional measurements (e.g., of the mask and wafer relative to each other) and measurements of the optical performance of the CPB optical system. Making such measurements is typically facilitated by fiducial (reference) marks that serve as points of reference. By way of example, an electron-beam exposure apparatus typically directs an electron beam to irradiate a fiducial mark situated on a wafer stage and detects electrons reflected from the fiducial mark.

Typical fiducial marks comprise a pattern of rectangular "voids," spaced apart from one another at a selected pitch on a mark substrate. Electrons from the electron beam are reflected from, e.g., regions of the mark situated between the voids, and pass through the voids.

Conventional fiducial marks include marks etched in silicon and marks patterned using a heavy metal. Marks etched in silicon are generally formed by applying a resist to a silicon substrate, inscribing a pattern into the resist using an electron beam to form a resist mask, and selectively etching the silicon substrate using the resist mask. Marks patterned using a heavy metal are generally formed by depositing, in a desired pattern, a heavy metal layer on a suitable substrate; by using a resist mask as described above and etching, a pattern is formed in the heavy metal layer.

One drawback of conventional methods for forming fiducial marks is that such methods produce mark patterns having imperfect edges. The magnitude of edge imperfection, i.e., edge "roughness," is about 10 nm in resist patterns formed by electron-beam inscription. Such edge roughness is amplified during subsequent etching or deposition of heavy metal; the resulting fiducial marks have pattern edge roughness of about 20 nm.

The precision of aberration measurements corresponds to the accuracy of the fiducial mark used in making the measurements. The magnitude of edge roughness in marks produced by either of the foregoing methods adversely affects the detection signal, which decreases the accuracy of the aberration measurements. Also, a charged-particle beam having a large-area transverse section is typically used in CPB projection-exposure apparatus; such a beam causes the signal-to-noise (S/N) ratio of aberration measurements performed using a heavy-metal fiducial mark to be reduced due to background noise from the mark substrate.

SUMMARY OF THE INVENTION

It is therefore an object of this invention to provide fiducial marks exhibiting improved edge accuracy for use in charged-particle-beam exposure apparatus. It is also an object of this invention to provide methods for forming such fiducial marks.

According to a first aspect of the invention, methods are provided for forming a fiducial mark. According to a first embodiment, a first Si substrate is provided having a monocrystalline structure defining a (110) crystal plane, a (111) crystal plane, and a [112] orientation of the (110) crystal plane. The first substrate has a "working surface" in the (110) crystal plane. An etching mask is formed on the working surface. The etching mask comprises a pattern of features at a selected pitch. The features are each extended in a longitudinal direction (e.g., rectangularly shaped, with a long side extending in the longitudinal direction) that is parallel to the [112] orientation of the (110) crystal plane. The working surface of the first substrate is etched along the (111) crystal plane so as to form a first pattern of voids in the first substrate corresponding to the pattern of features of the etching mask, thereby forming a fiducial mark comprising the first pattern of voids defined by the first substrate. Each void can extend through a thickness dimension of the first substrate, or each void can be a groove extending into the thickness dimension of the first substrate.

The method can further comprise the steps of removing residual etching mask from the first substrate, and applying a layer of metal (preferably platinum) to the working surface and walls of the voids in the first substrate.

The method can further comprise providing a second Si substrate having a monocrystalline structure defining a (110) crystal plane, a (111) crystal plane, a [112] orientation of the (110) crystal plane, and a planar surface in the (110) crystal plane. A pattern of voids is formed in the second substrate in a manner similar to the manner in which the pattern of voids was formed in the first substrate, wherein the second pattern of voids comprises a second fiducial mark. Afterward, the second substrate is placed in a superposed relationship with respect to the first substrate so that the longitudinal direction of the voids in the pattern formed in the first substrate is aligned perpendicularly to the longitudinal direction of the voids in the pattern formed in the second substrate.

In addition, a first cutout void can be formed in the first substrate. The first cutout void preferably has an area larger than, and located so as to be aligned with, the second pattern of voids in the second substrate after the first and second substrates are placed in superposed relationship. Also, a second cutout void can be formed in the second substrate. The second cutout void preferably has an area larger than, and located so as to be aligned with, the first pattern of voids in the first substrate after the first and second substrates are placed in superposed relationship.

To facilitate placing the first and second substrates in superposed relationship, a member can be provided that comprises alignment pins or analogous structures. During alignment of the first and second substrates, the alignment pins are inserted into alignment holes defined in the first and second substrates. By way of example, the alignment pins can be provided on the rim of a Faraday cage (a type of charged-particle-beam detector and beam-current measurement device) attached to the member, wherein the alignment pins extend from the rim. The respective alignment holes defined in the first and second substrates are preferably situated such that, after the pins are inserted into the alignment holes, the pattern of features on the first substrate and the pattern of features on the second substrate are situated over the Faraday cage.

In an alternative method, a second pattern of voids is formed in the first substrate (rather than in a second substrate). The voids in the second pattern are preferably arranged at a preselected pitch and are extended in a longitudinal direction on the working surface that is perpendicular to the longitudinal direction of the voids in the first pattern. Afterward, a metal layer is preferably applied to the working surface.

According to another embodiment of the methods, a Si substrate is provided having a planar surface coated with an $SiO_2$ layer, the substrate having a monocrystalline structure defining a (110) crystal plane, a (111) crystal plane, and a [112] orientation of the (110) crystal plane, wherein the planar surface is in the (110) crystal plane. A resist pattern is formed on the planar surface. The resist pattern preferably has a longitudinal direction that is parallel with the [112] orientation of the (110) crystal plane, preferably comprises multiple longitudinally extended features (e.g., rectangles or the like) at a preselected pitch, and preferably defines protected areas and non-protected areas. The $SiO_2$ is chemically removed from the non-protected areas to form an $SiO_2$ mask. The planar surface is anisotropically etched along the (111) crystal plane so as to form a pattern of voids in the Si substrate corresponding to the pattern of features, thereby forming the fiducial mark. Preferably, a layer of metal (e.g., platinum) is applied to the planar surface.

According to another embodiment of the method, a Si substrate is provided having a monocrystalline structure defining a (100) crystal plane and a (111) crystal plane. The substrate has a planar surface in the (110) crystal plane. An etching mask is formed on the planar surface. The etching mask preferably comprises a first mark pattern and a second mark pattern. Each of the first and second mark patterns comprises multiple longitudinally extended features at a preselected pitch. The mark patterns are preferably arranged so that the longitudinal dimension of the features of the first mark pattern is perpendicular to the longitudinal dimension of the features of the second mark pattern. The substrate is anisotropically etched, according to the etching mask, along the (111) crystal plane so as to form a hole pattern in the substrate corresponding to the first and second mark patterns, thereby forming a fiducial mark.

According to yet another method embodiment, a Si substrate is provided having an N-type monocrystalline structure defining a (100) crystal plane and a (111) crystal plane. The substrate preferably has a first planar surface in the (100) crystal plane and a second planar surface in the (100) crystal plane. A P-type layer (e.g., a 1 $\mu$m-thick boron-diffusion layer) is applied to the second planar surface to form a P-layer surface that defines a P/N junction between the P-type layer and the substrate. The substrate is oxidized to form an $SiO_2$ layer on the first planar surface and on the P-layer surface. The $SiO_2$ layer is removed on the first planar surface in an area larger than an area in which a mark pattern is to be formed, so as to form a first $SiO_2$ mask. Using the remaining portions of the first $SiO_2$ layer as a mask, the substrate is anisotropically etched on the first planar surface along the (111) crystal plane. The etching is allowed to proceed to the P/N junction. A resist pattern is then formed on the $SiO_2$ on the P-layer surface. The resist pattern preferably comprises multiple longitudinal features at a preselected pitch defining protected and unprotected areas. The $SiO_2$ is removed from the unprotected areas so as to form a second $SiO_2$ mask. Using the second $SiO_2$ layer as a mask, the substrate is anisotropically etched on the P-layer surface along the (111) crystal plane so as to form a through-hole pattern in the substrate. A metallic layer is then formed on the substrate in an area defined by the first $SiO_2$ mask. Remaining $SiO_2$ is then removed to form the fiducial mark. In this method, the resist pattern can comprise a first mark and a second mark, wherein the first and second marks each comprise multiple rectangles at a selected pitch and the first mark is oriented perpendicularly to the second mark. Furthermore, the resist pattern can be sized so as to compensate for an approximately 55-degree taper angle formed during anisotropically etching the (100) crystal plane surface along the (111) crystal plane.

According to another aspect of the invention, fiducial marks are provided that are formed by any of the various methods according to the invention.

According to yet another aspect of the invention, charged-particle-beam exposure apparatus are provided. Such apparatus generally comprise a fiducial mark according to the invention. The apparatus also generally comprise a first charged-particle-beam optical system for directing a charged-particle beam from a source to an alignment mark on a mask, and a second charged-particle-beam optical system for directing the charged-particle beam from the alignment mark on the mask to the fiducial mark. A charged-particle detector is situated so as to detect charged particles from the beam that interact with the fiducial mark.

The foregoing and additional features and advantages of the invention will be more readily apparent from the following detailed description, which proceeds with reference to the accompanying drawings.

DETAILED DESCRIPTION

Figure 1A:
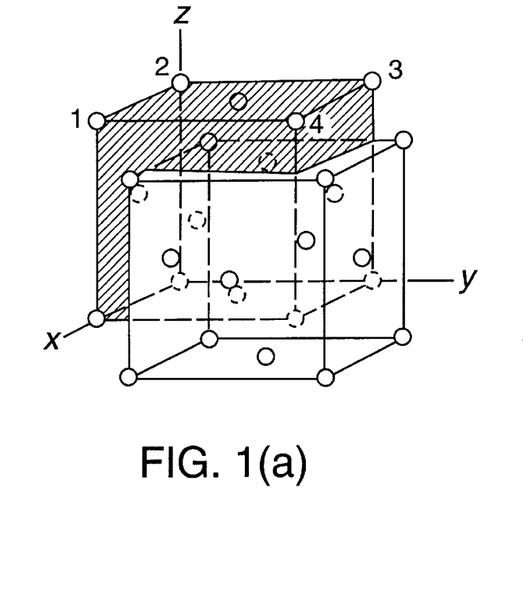
FIG. 1(a) shows a representative diamond-lattice structure of monocrystalline silicon at atmospheric pressure.
Figure 1B:
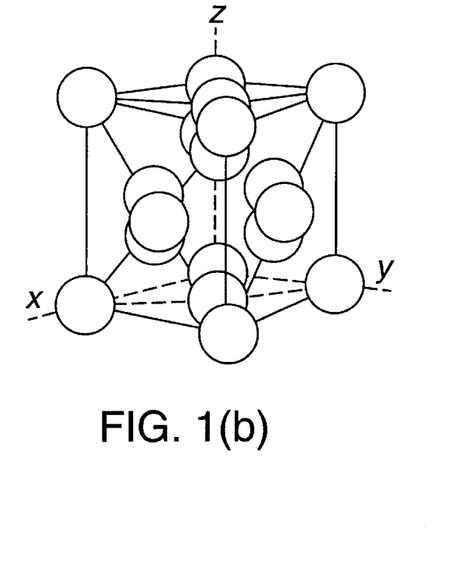
FIG. 1(b) shows inter-atomic bonds of the diamond-lattice structure of FIG. 1(a).

Silicon (Si) is commonly used in the manufacture of semiconductors. For such purposes, especially for use as a substrate, the silicon is usually monocrystalline and "grown" from a crystal seed so as to have a very-well defined crystalline structure. FIG. 1(a) shows a representative diamond cubic structure of monocrystalline Si at atmospheric pressure. A diamond cubic structure, or lattice, can be described as two interpenetrating face-centered cubes displaced ($a_0/4$, $a_0/4$, $a_0/4$) from each other in a right-handed x-y-z coordinate system, wherein $a_0$ is the lattice spacing (i.e., the length of a unit cell). The circles in FIGS. 1(a) and 1(b) represent Si atoms. The Si atoms are bonded together in a tetrahedral fashion, as shown in FIG. 1(b), where the lines interconnecting the Si atoms represent interatomic bonds.

Figure 1C:
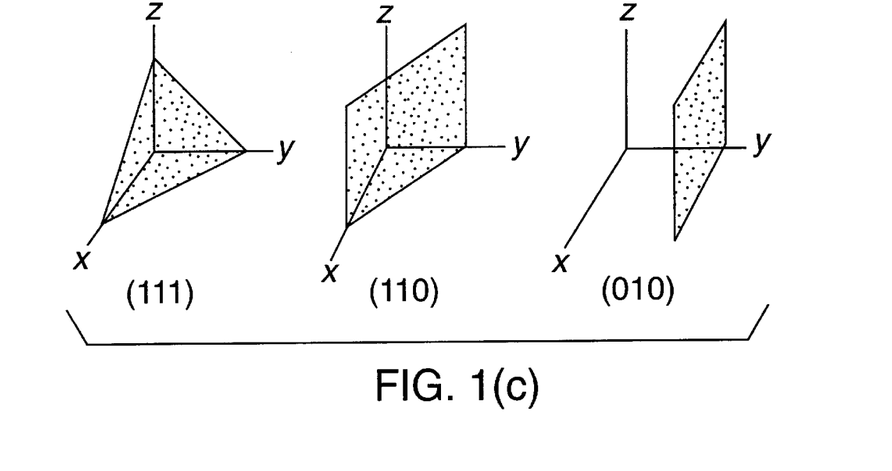
FIG. 1(c) shows examples of Miller index planes.

When viewed from certain perspectives, certain of the Si atoms and their bonds appear to reside in planes. To describe the position of such planes and the directions of the respective bonds, it is conventional practice to use Miller indices. The Miller indices of a plane intersecting the x-y-z axes at distances a, b, c, respectively, from the origin are the smallest set of integers hkl, wherein h=1/a, k=1/b, and l=1/c. For describing a plane containing a specific set of atoms within a unit cell, the reciprocals are used directly. Miller indices are written as (hkl). For example, FIG. 1(c) shows the low-index planes (111), (110), and (010). Whenever a plane is parallel to an x, y, or z axis, the plane intersects the axis at infinity, and the reciprocal is zero. Thus, a (010) plane is parallel with both the x and z axes. A crystallographic direction is written as [hkl]. In the cubic system, the [hkl] direction is perpendicular to the (hkl) plane. A family of hkl directions is designated as <hkl>. A direction is representable as a vector; if the vector extends from the origin to x=u, y=v, and z=w, then the vector has the direction coordinates [uvw]. The direction indices [hkl] are the smallest set of integers having a ratio of u:v:w. Just as all parallel planes have the same Miller indices, all parallel directions have the same direction indices.

When monocrystalline Si is etched with certain etching chemicals, such as hydrazine or KOH, the resulting etching is anisotropic, i.e., the etching does not proceed at an equal rate in all directions. More specifically, etching occurs preferentially along certain planes and directions relative to the etching surface plane of the Si crystal. For example, whenever a Si substrate with a surface in the (110) crystal plane is etched using a mask defining features extending lengthwise in the [112] orientation of the (110) crystal plane, the lengthwise etching will be performed along the (111) plane of the crystalline structure. As a result, the etched-pattern walls in the lengthwise direction are nearly perfectly planar. Furthermore, the lengthwise edges that are formed between the (111) crystal plane and the (110) (surface) crystal plane are nearly perfectly linear. The level of imperfection in these edges (edge "roughness") is about equal to the lattice spacing $a_0$.

This invention exploits the foregoing anisotropic etching characteristic of monocrystalline Si to form improved fiducial marks, as is described below in connection with multiple example embodiments that collectively represent the current best mode of the invention.

EXAMPLE EMBODIMENT 1

Figure 2:
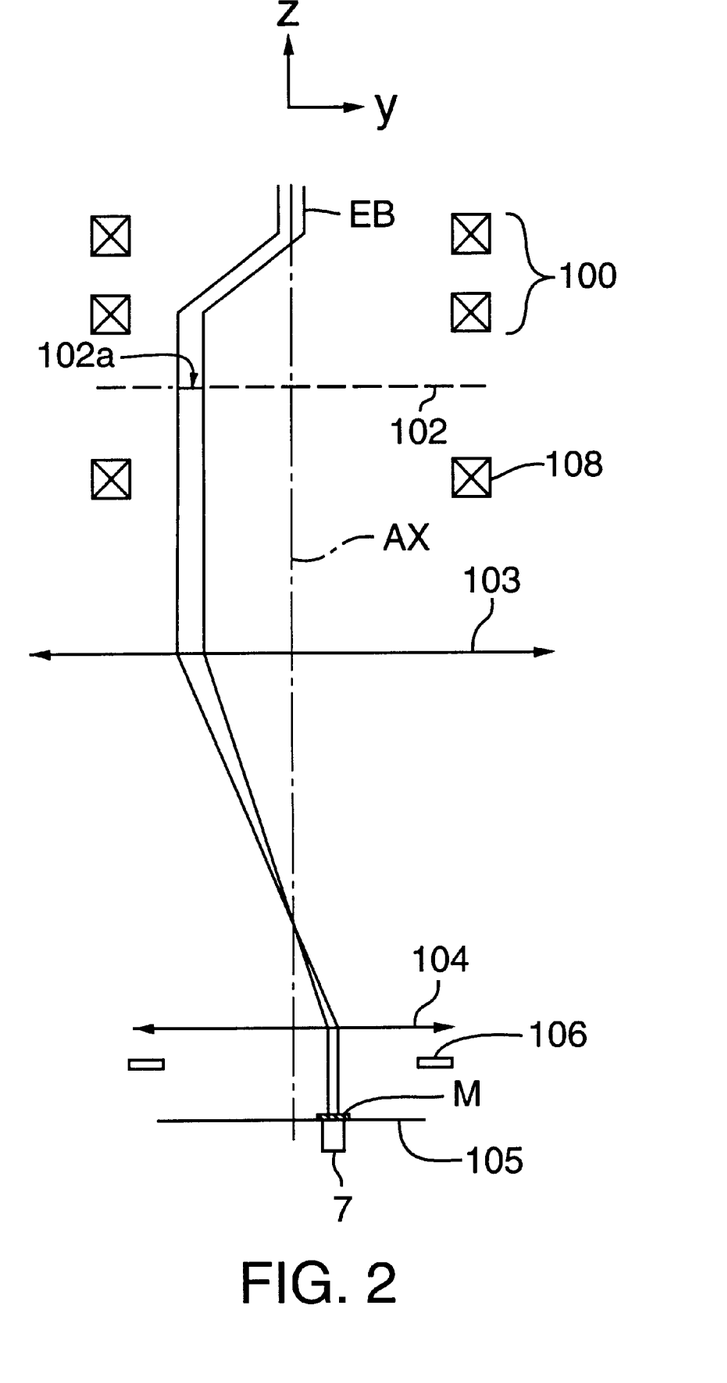
FIG. 2 is a schematic elevational view of an electron-beam optical system of a charged-particle-beam (CPB) exposure apparatus comprising a fiducial mark according to a first example embodiment of the invention.

FIG. 2 schematically shows the optical system of a CPB exposure apparatus that comprises a fiducial mark, according to this example embodiment, for measuring aberrations (e.g., distortion) of the optical system. A charged-particle beam EB emitted from and shaped by a charged-particle-beam source (not shown but understood to be upstream of the top of the figure) is deflected by a deflector 100 and irradiated onto a mask subfield 102a, comprising certain alignment marks, on a mask 102. The portion of the charged-particle beam EB passing through the subfield 102a passes through a CPB optical system, comprising lenses 103, 104, and is incident on a fiducial mark M mounted on a wafer stage 105. The wafer stage 105 extends in an x-y plane that is perpendicular to the z axis and the optical axis AX.

The fiducial mark M defines a pattern of "holes" and "non-hole" features. A Faraday cage 7 is situated beneath the fiducial mark M. A "Faraday cage" is a beam-current measuring device, as known in the art, comprising an enclosure defining an entrance aperture and having an interior rear wall opposite the entrance aperture, the enclosure having a length between the entrance aperture and the rear wall. The charged-particle beam enters the enclosure through the entrance aperture and impinges on the rear wall; such impingement generates scattered electrons and backscattered electrons. The length of the enclosure is normally much greater than the diameter of the entrance aperture to minimize escape of the scattered and backscattered electrons from the enclosure, thereby allowing accurate measurements of beam current.

Aberrations of the CPB optical system are measured by scanning the charged-particle beam EB in the x and y directions by a deflector 108. Charged particles reflected from "non-hole" areas of the fiducial mark M are detected using a detector 106; charged particles passing through the "hole" areas in the fiducial mark M are absorbed by the Faraday cage 7.

Figure 3:
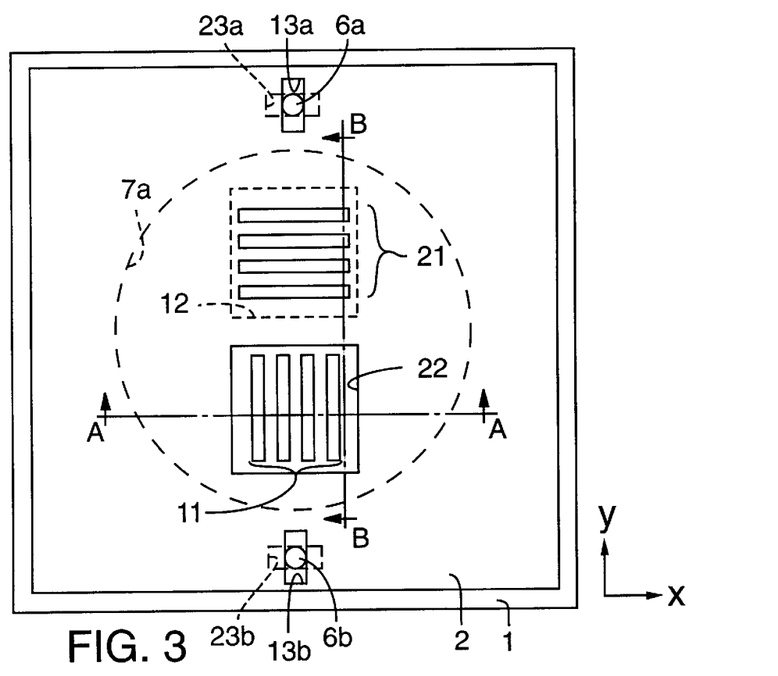
FIG. 3 is a plan view of a fiducial mark according to a first example embodiment of the invention.
Figure 4A:
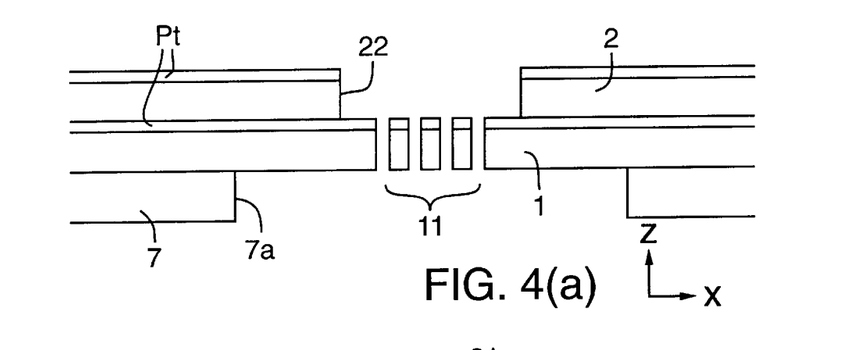
FIG. 4(a) is an elevational section, along the line A—A, of the FIG. 3 embodiment.
Figure 4B:
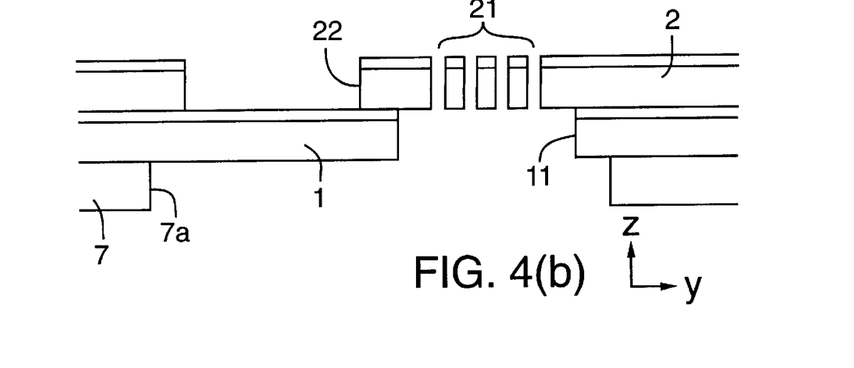
FIG. 4(b) is an elevational section, along the line B—B, of the FIG. 3 embodiment.

FIGS. 3 and 4(a)–4(b) show details of a fiducial mark M according to this example embodiment. The fiducial mark M comprises two separate marks: a first mark 11 formed on a first substrate 1, and a second mark 21 formed on a second substrate 2. The first mark 11 is used for evaluating CPB resolution and/or CPB position in the x direction. The first mark 11 comprises a pattern of multiple longitudinally extended (e.g., rectangular) "holes" (voids, cavities, or apertures) that extend lengthwise in the y direction and are arranged at a selected pitch in the x direction. The second mark 21 is used for evaluating CPB resolution and/or CPB position in the y direction. The second mark 21 comprises a pattern of multiple longitudinally extended (e.g., rectangular) "holes" (voids, cavities, or apertures) that extend lengthwise in the x direction and are arranged at a selected pitch in the y direction. Each of the first substrate 1 and the second substrate 2 is a monocrystalline Si substrate having a substrate surface (i.e., surface parallel to the x-y plane) that is in the (110) plane of the Si crystal.

As shown in FIG. 3, the first and second substrates 1, 2 are superposed and mounted onto an aperture portion 7a of the Faraday cage 7. Thus, an alignment aperture 13a defined by the first substrate 1 and an alignment aperture 23a defined by the second substrate 2 fit onto a first alignment pin 6a extending from the surface of the Faraday cage 7; similarly, an alignment aperture 13b defined by the first substrate 1 and an alignment aperture 23b defined by the second substrate 2 fit onto a second alignment pin 6b extending from the surface of the Faraday cage 7.

In such a manner, the first and second substrates 1, 2 are positioned by the alignment pins 6a, 6b such that the longitudinal directions of the marks 11 are perpendicular to the longitudinal direction of the marks 21. An opening 12 is defined by the first substrate 1 and an opening 22 is defined by the second substrate 2 so that the areas in which the marks 11, 21 are formed are not overlapped by the other substrate.

The hole pattern in the mark 11 is formed as follows: The first substrate 1 is placed in an oxidation furnace (or subjected to an analogous process) to form a 1-$\mu$m thick $SiO_2$ coating on both major surfaces of the first substrate 1. A resist pattern is formed on one of the major surfaces (i.e., on an "working surface") of the first substrate. The resist pattern includes longitudinally extended (e.g., rectangular) features each having a longitudinal direction that is parallel to the [112] orientation of the (110) crystal plane. An $SiO_2$ mask is then formed by chemically removing the $SiO_2$ in areas that are not protected by the resist. The first substrate 1 is then anisotropically etched according to the $SiO_2$ mask using hydrazine, KOH, or the like. Since the features formed in the $SiO_2$ mask are oriented such that their longitudinal direction is oriented parallel to the [112] orientation of the (110) crystal plane, anisotropic etching performed along the (111) crystal plane produces longitudinally extended apertures extending depthwise into the first substrate perpendicular to the major surface of the first substrate; thus, the side walls of the apertures are in the (111) crystal plane. A heavy metal (e.g., Pt) layer is then deposited on the top surface of the first substrate 1, as shown in FIG. 4(a).

The mark 21 is formed on the second substrate 2 in a similar manner.

Although there is typically some residual edge roughness in $SiO_2$ mask features, the roughness of the edges in the resultant mark features formed on the first and second substrates 1, 2 is on the order of the crystalline lattice spacing. This is due to the behavior of a monocrystalline structure when anisotropically etched. The substrate working surface is in the (110) crystal plane, and the longitudinal direction of the features is in the [112] orientation. Thus, anisotropic etching (the rate of which depends upon on the plane orientations of the crystal being etched) forms voids having side walls in the (111) crystal plane. As a result, the edges of the mark features are substantially unaffected by edge roughness of the $SiO_2$ mask.

The edge roughness of the features on the marks 11, 12 is substantially reduced compared to the prior art. As a result, aberrations of the CPB optical system can be measured more accurately using the fiducial mark M than with conventional fiducial marks. Also, an extremely high S/N ratio signal can be obtained using the fiducial mark M since the non-hole areas on the marks 11, 21 comprise a heavy-metal (e.g., Pt) layer that reflects charged particles irradiated on such areas. Charged particles that pass through the hole areas are absorbed by the Faraday cage 7 situated under the first and second substrates 1, 2 (i.e., on the exit side relative to the charged-particle beam).

Even though the marks 11, 21 are displaced relative to each other in the z direction due to the superposed relationship of the first and second substrates 1, 2, the focal depth of the charged-particle beam is sufficiently deep so that the effect of the z-direction displacement is not problematic so long as the mark area of at least one of the substrates is thin.

In this example embodiment, the marks comprise "bottomless" through-hole features. Alternatively, the marks can comprise grooved hole features each having a bottom. In the alternative instance, the Faraday cage is not necessary.

EXAMPLE EMBODIMENT 2

Figure 5A:
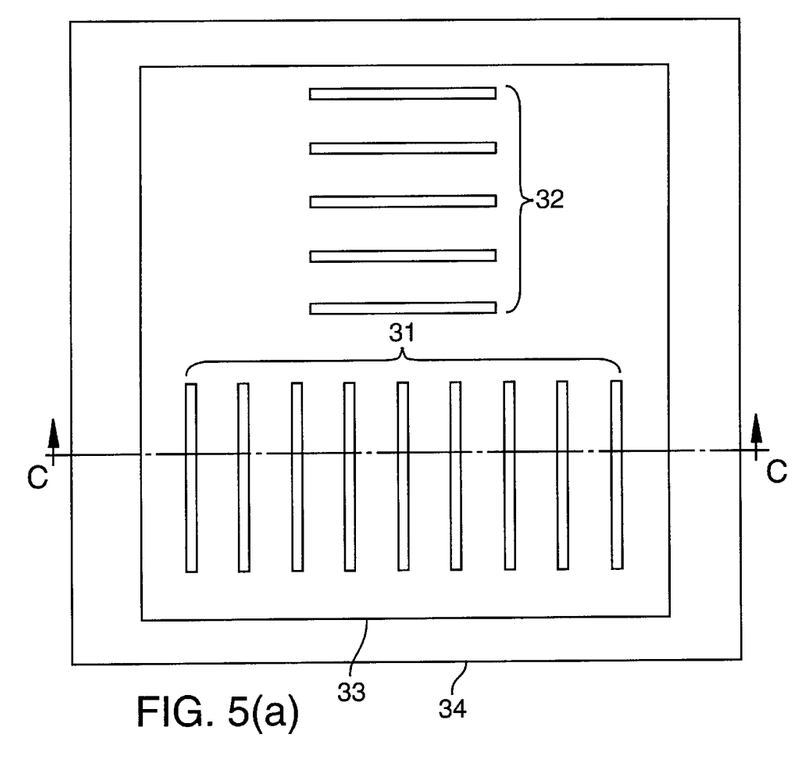
FIG. 5(a) is a plan view of a fiducial mark according to a second example embodiment of the invention.
Figure 5B:
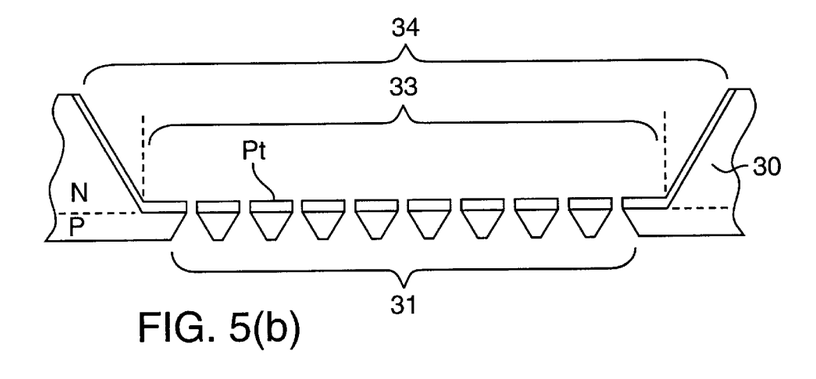
FIG. 5(b) is an elevational section, along the line C—C, of the FIG. 5(a) embodiment.

In this example embodiment, two sets of marks 31, 32 are formed on a single monocrystalline Si substrate 30, as shown in FIGS. 5(a)–5(b). The marks 31, 32 are formed in a mark area 33 and each comprises a pattern of multiple parallel longitudinally extended (e.g., rectangular) features at a selected pitch. The marks 31, 32 are arranged so that the longitudinal orientation of the features of the mark 31 are perpendicular to the longitudinal orientation of the features of the mark 32. Similar to the respective marks 21, 22 shown in FIG. 3, the mark 31 can be used for evaluating CPB resolution or position in the x direction and the mark 32 can be used for evaluating CPB resolution in the y direction.

Figure 6A:
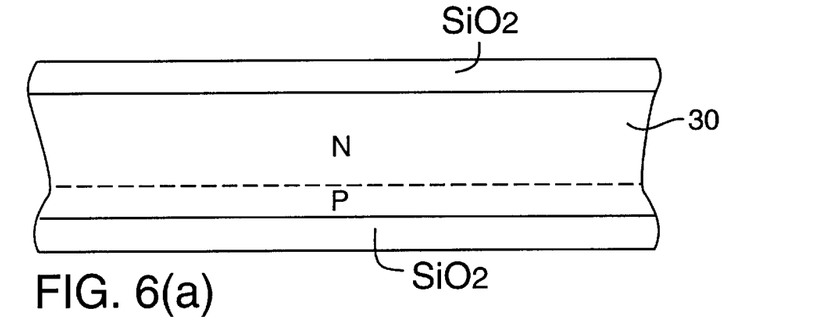
FIGS. 6(a)–6(d) are elevational sections showing the results of certain respective steps in a process for making a fiducial mark according to the second example embodiment.
Figure 6B:
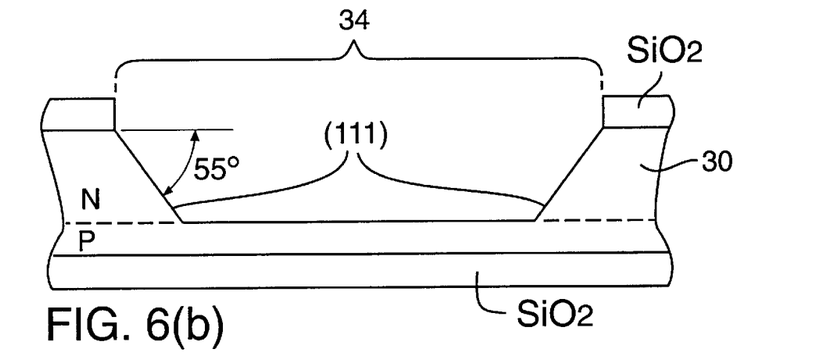

A procedure for manufacturing the marks 31, 32 is as follows, with reference to FIGS. 5(a) and 6(a)–6(d). The marks 31, 32 are formed in an N-type monocrystalline Si substrate having a planar surface in the (100) crystal plane. As shown in FIG. 6(a), a 1 $\mu$m-thick "P" layer is formed by diffusing boron into a major surface of the substrate 30 (specifically the bottom surface as shown in FIG. 6(a)). The substrate 30 is placed in an oxidation furnace (or subjected to analogous conditions) to form a 1-$\mu$m thick $SiO_2$ layer on both its major surfaces. Next, as shown in FIG. 6(b), the $SiO_2$ layer is removed from an area 34 larger than the mark area 33 in which the marks 31, 32 will be formed. Anisotropic etching is performed using hydrazine, KOH, or the like, using the remaining $SiO_2$ as a mask. During the anisotropic etching a voltage is applied to the P-type layer so as to cause the etching to stop at the P/N junction defined at the boundary of the P-type layer with the N-type Si substrate. Since anisotropic etching of an exposed (100) plane of monocrystalline Si occurs along the (111) crystal plane, the slope angle (relative to a major surface) of the resultant cavities produced by etching is approximately 55 degrees, as shown in FIG. 6(b).

Figure 6C:
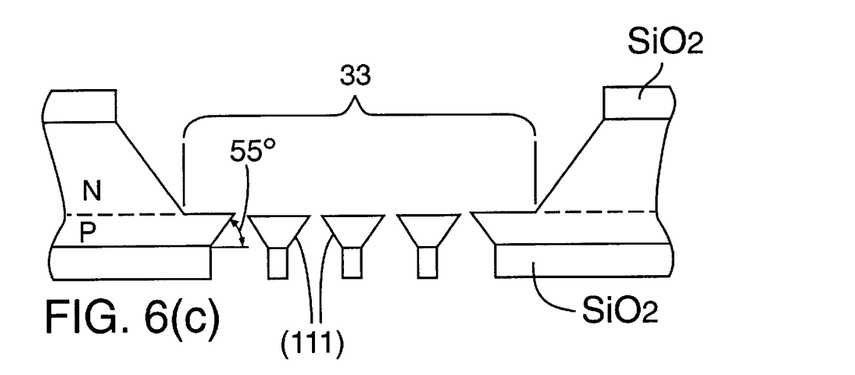

Turning now to FIG. 6(c), a masking resist pattern is formed on the $SiO_2$ on the P-layer side of the substrate 30. $SiO_2$ in the pattern area not protected by the resist is removed to form an $SiO_2$ mask. A second anisotropic etching is then performed on the P-layer side so as to form through-hole features in the substrate 30. The masking resist pattern is sized to compensate for the approximately 55-degree taper produced by the anisotropic etch.

Although only the features in the mark 31 are shown in FIG. 6(c), the features of the mark 32 are simultaneously formed during these processing steps.

Figure 6D:
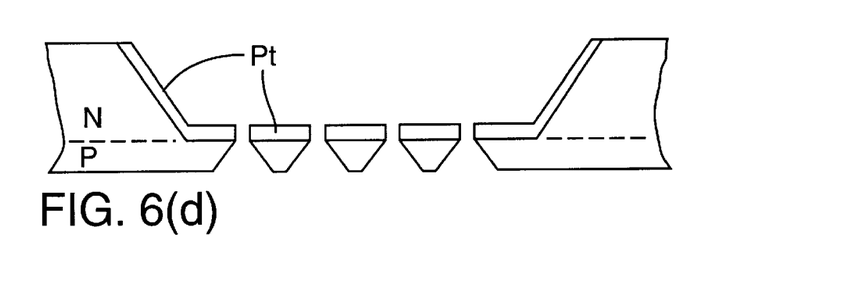

Subsequently, as shown in FIG. 6(d), a layer of Pt is deposited on the area 33, after which residual $SiO_2$ is removed.

During use of a fiducial mark, according to this example embodiment, for detecting aberrations of a CPB optical system, the substrate 30 in which the marks 31, 32 have been formed is mounted on the detection aperture of a Faraday cage, as in Example Embodiment 1. The Pt-deposited surface (the upper surface shown in FIG. 5(b)) serves as the incident surface for the charged-particle beam.

In this example embodiment, the edges of the mark features are sharp because of the tapered walls of each of the longitudinally extended features formed along the (111) crystal plane. As with Example Embodiment 1, the Pt layer reflects charged particles irradiated on the non-hole areas of the fiducial mark of Example Embodiment 2, while the Faraday cage absorbs charged particles that pass through the hole areas, thereby producing an extremely high S/N ratio signal. Due to the tapered walls of the features, the minimum pattern pitch available with this example embodiment is higher than the pattern pitch that can be realized with the fiducial mark of, e.g., Example Embodiment 1. Whereas a higher pitch can be disadvantageous in terms of the S/N ratio, in this example embodiment the orthogonal relationship between the mark 31 and the mark 32 is increased (compared to Example Embodiment 1) since the marks 31, 32 are formed in the same substrate 30.

EXAMPLE EMBODIMENT 3

Figure 7:
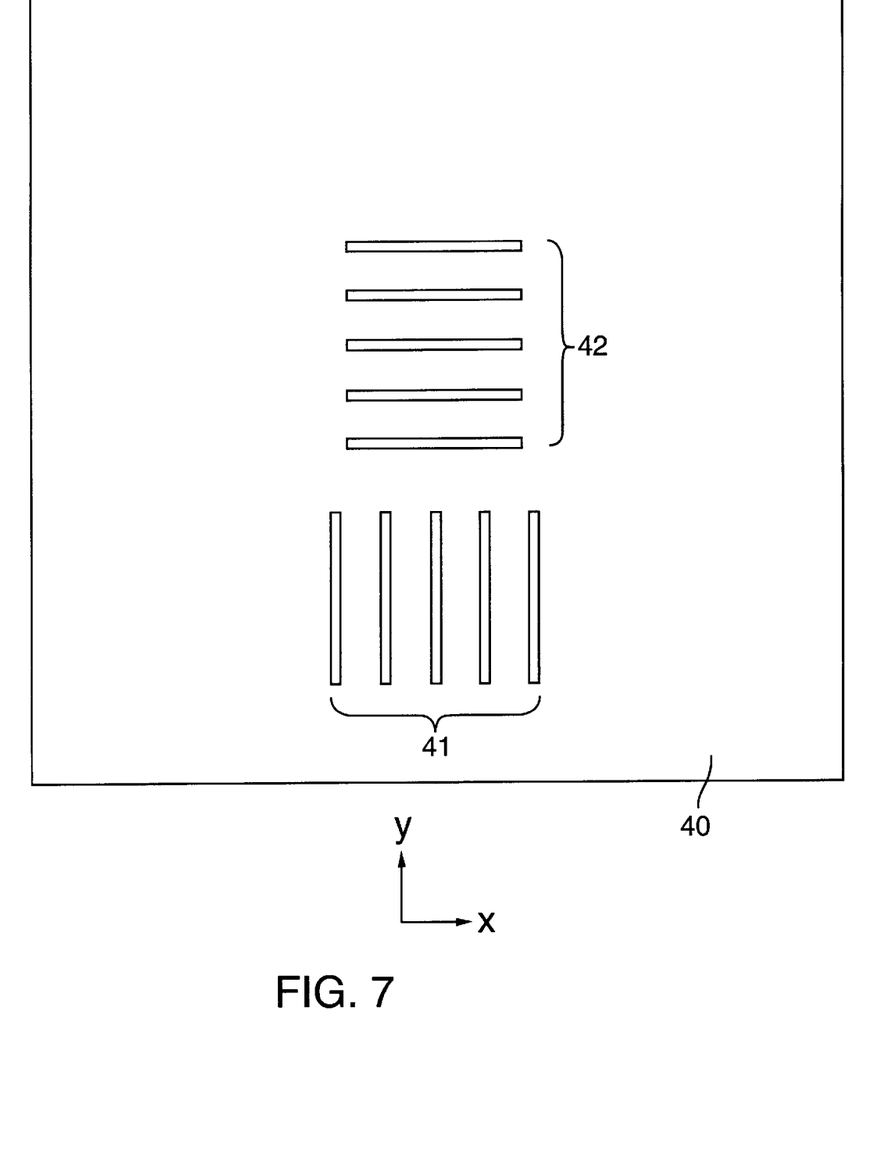
FIG. 7 is a plan view of a fiducial mark according to a third example embodiment of the invention.

In this example embodiment two marks 41, 42 are formed in a single substrate 40, as shown in FIG. 7. Each of the marks 41, 42 comprises multiple longitudinally extended (e.g., rectangular) features at a selected pitch. The marks 41, 42 can be formed by the following three-step process. In the first step, the mark 41 is formed by anisotropic etching of a monocrystalline Si substrate (presenting a (110) crystal plane in the major surfaces) using hydrazine, KOH, or the like. The longitudinal direction of the features extends in the [112] orientation of the (110) crystal plane, similar to the anisotropic etching process used to form the marks 11, 12 in Example Embodiment 1. The mark 42 is then formed perpendicular to the mark 41 by reactive-ion etching (RIE), after which a layer of Pt is deposited on the top surface (in the figure) of the substrate 40.

The foregoing process can produce an excellent orthogonal relationship between the marks 41, 42. However, the pattern edge roughness of the longitudinally extended holes of the mark 42, formed by RIE, tends to be inferior to the edge roughness of the longitudinally extended holes of the mark 41 formed by anisotropic etching. Therefore, more accurate aberration measurements can be obtained using the mark 41 than using the mark 42.

In CPB projection-exposure apparatus that employ a segmented mask, the mask pattern for a single die is divided into multiple mask subfields. The mask pattern is projected subfield-by-subfield onto a sensitive substrate mounted on a substrate stage. After each mask subfield is projected onto a corresponding "transfer subfield" on the substrate, the substrate stage "steps" to allow exposure of the next transfer subfield. The exposure field of the CPB optical system is usually shaped to have a square or rectangular transverse profile (if rectangular, the long dimension preferably extends perpendicular to the stepping direction). Thus, it is necessary to measure the distortion characteristics of the exposure field in the longitudinal direction with especially high accuracy; the measurement accuracy in the stepping direction can be lower. Therefore, measurement of distortion in the longitudinal direction of the exposure field is preferably performed using the mark 41, while measurement in the stepping direction can be performed using the mark 42.

Therefore, this invention provides improved fiducial marks. As described above, since the side walls of the features of the fiducial marks of Example Embodiments 1 and 3 are in the (111) crystal plane, the roughness of the pattern edges is on the order of the lattice spacing of the Si crystal, thereby yielding extremely sharp feature edges. Such extremely sharp edges facilitate improved mark detection; thus, aberrations in the CPB optical system can be measured with extremely high accuracy. Additionally, since charged particles irradiated onto the non-hole areas of the fiducial marks are reflected by the metallic film, the S/N ratio of the reflected CPB signal is improved and aberrations are measured with greater accuracy.

While the present invention has been described in connection with preferred embodiments, it will be understood that the invention is not limited to those embodiments. On the contrary, the invention is intended to cover all alternatives, modifications, and equivalents as may be included within the spirit and scope of the invention as defined in the appended claims.

What is claimed is:

1. A method for obtaining a measurement of an imaging characteristic of a charged-particle-beam exposure apparatus, the method comprising the steps:
   (a) forming a fiducial mark by (i) providing a first Si substrate having a monocrystalline structure defining a (110) crystal plane, a (111) crystal plane, and a [112] orientation of the (110) crystal plane, the first substrate having a working surface in the (110) crystal plane; (ii) forming an etching mask on the working surface, the etching mask comprising a pattern of features at a selected pitch, the features each being extended in a respective longitudinal direction, the etching mask being formed such that the longitudinal direction is parallel to the [112] orientation of the (110) crystal plane; and (iii) anisotropically etching into the working surface of the first substrate along the (111) crystal plane so as to form a first pattern of voids in the first substrate corresponding to the pattern of features defined by the etching mask, thereby forming the fiducial mark comprising the first pattern of voids on the first substrate, wherein each void extends into a thickness dimension of the first substrate;
   (b) mounting the fiducial mark on a wafer stage defining a plane extending in x and y directions;
   (c) directing a charged particle beam to be incident on the fiducial mark;
   (d) scanning the charged particle beam in the x and y directions over the fiducial mark;
   (e) detecting charged particles from the charged particle beam passing through the fiducial mark, and producing a corresponding signal from the detection; and
   (f) from the signal, determining a measurement of the imaging characteristic.

2. The method of claim 1, wherein each void extends through the thickness dimension of the first substrate.

3. The method of claim 1, wherein step (a) further comprises the steps, after step (iii), of:
   removing residual etching mask from the first substrate; and
   applying a layer of metal to the working surface and walls of the voids in the first substrate.

4. The method of claim 3, wherein the metal is Pt.

5. The method of claim 1, wherein the features are rectangular each having a long side extending in the longitudinal direction.

6. The method of claim 1, wherein step (a) further comprises the steps, after step (iii), of:
   (iv) providing a second Si substrate having a monocrystalline structure defining a (110) crystal plane, a (111) crystal plane, and a (112) orientation of the (110) crystal plane, the second substrate having a planar surface in the (110) crystal plane;
   (v) performing steps (ii)–(iii) on the second substrate to form a second pattern of voids on the second substrate, the second pattern of voids comprising a second fiducial mark, the voids in the second pattern having a longitudinal direction; and
   (vi) superposing the second substrate with respect to the first substrate so that the longitudinal direction of the voids in the pattern formed in the first substrate is aligned perpendicularly to the longitudinal direction of the voids in the pattern formed in the second substrate.

7. The method of claim 6, wherein:
   in steps (ii) and (iii), a first cutout void is formed in the first substrate having an area larger than, and located so as to be aligned with, the second pattern of voids in the second substrate upon completion of step (vi); and
   in step (v), a second cutout void is formed in the second substrate having an area larger than, and located so as to be aligned with, the first pattern of voids in the first substrate upon completion of step (vi).

8. The method of claim 1, further comprising the step of providing a member comprising alignment pins, wherein step (vi) further comprises aligning the second substrate with the first substrate by inserting the alignment pins into alignment holes defined in the first and second substrates.

9. The method of claim 8, wherein:

the member comprises a Faraday cage comprising a rim from which the alignment pins extend; and the respective alignment holes defined in the first and second substrates are situated such that, upon completion of step (vi), the pattern of features on the first substrate and the pattern of features on the second substrate are situated over the Faraday cage.

10. The method of claim 1, wherein step (a) further comprises the steps, after step (iii), of:

(iv) forming a second pattern of voids in the first substrate, the voids in the second pattern each being extended in a longitudinal direction on the working surface that is perpendicular to the longitudinal direction of the voids in the first pattern, the voids of the second pattern being arranged at a preselected pitch; and (v) applying a layer of metal to the working surface.

11. A method for obtaining a measurement of an imaging characteristic of a charged-particle-beam exposure apparatus, the method comprising the steps:

(a) forming a fiducial mark by (i) providing a Si substrate having a planar surface coated with an $SiO_2$ layer, the substrate having a monocrystalline structure defining a (110) crystal plane, a (111) crystal plane, and a [112] orientation of the crystal plane, the planar surface being in the (110) crystal plane; (ii) forming a resist pattern on the planar surface of the substrate, the resist pattern having a longitudinal direction that is parallel to the [112] orientation of the (110) crystal plane and comprising multiple rectangles at a preselected pitch, the resist pattern defining protected areas and non-protected areas; (iii) removing the $SiO_2$ in the non-protected areas; (iv) anisotropically etching into the planar surface of the substrate along the (111) crystal plane so as to form a pattern of voids in the substrate, the pattern of voids comprising the fiducial mark; and (v) applying a layer of metal to the planar surface;

(b) mounting the fiducial mark on a wafer stage defining a plane extending in the x and y directions;

(c) directing a charged particle beam to be incident on the fiducial mark;

(d) scanning the charged particle beam in the x and y directions over the fiducial mark;

(e) detecting charged particles from the charged particle beam passing through the fiducial mark, and producing a corresponding signal from the detection; and (f) from the signal, determining a measurement of the imaging characteristic.

12. A method for obtaining a measurement of an imaging characteristic of a charged-particle-beam exposure apparatus, the method comprising the steps:

(a) forming a fiducial mark by (i) providing a Si substrate having a monocrystalline structure defining a (100) crystal plane and a (111) crystal plane, the substrate having a planar surface in the (100) crystal plane; (ii) forming an etching mask on the planar surface, the etching mask comprising a first mark pattern and a second mark pattern, the first and second mark patterns each comprising multiple longitudinally extended features at a preselected pitch, the mark patterns being arranged so that the features of the first mark pattern longitudinally extend in a direction perpendicular to a direction in which the features of the second mark pattern longitudinally extend; and (iii) anisotropically etching, according to the etching mask, the substrate along the (111) crystal plane so as to form a hole pattern in the substrate corresponding to the first and second mark patterns, the hole pattern forming a fiducial mark;

(b) mounting the fiducial mark on a wafer stage defining a plane extending in x and y directions;

(c) directing a charged particle beam to be incident on the fiducial mark;

(d) scanning the charged particle beam in the x and y directions over the fiducial mark;

(e) detecting charged particles from the charged particle beam passing through the fiducial mark, and producing a corresponding signal from the detection; and (f) from the signal, determining a measurement of the imaging characteristic.

13. A method for evaluating an imaging characteristic of a charged-particle-beam exposure apparatus, the method comprising the steps:

(a) forming a fiduciary mark by (i) providing a Si substrate having an N-type monocrystalline structure defining a (100) crystal plane and a (111) crystal plane, the substrate having a first planar surface in the (100) crystal plane and a second planar surface in the (100) crystal plane; (ii) applying a P-type layer to the second planar surface to form a P-layer surface, the P-layer surface defining a P/N junction between the P-type layer and the substrate; (iii) oxidizing the substrate to form an $SiO_2$ layer on the first planar surface and on the P-layer surface; (iv) removing the $SiO_2$ layer on the first planar surface in an area larger than an area in which a mark pattern is to be formed, so as to form a first $SiO_2$ mask; (v) anisotropically etching the substrate on the first planar surface along the (111) crystal plane using the first $SiO_2$ mask, the anisotropic etching being allowed to proceed to the P/N junction; (vi) forming a resist pattern on the $SiO_2$ on the P-layer surface, the resist pattern comprising multiple longitudinal features at a preselected pitch defining protected and unprotected areas; (vii) removing the $SiO_2$ from the unprotected areas so as to form a second $SiO_2$ mask; (viii) anisotropically etching the substrate on the P-layer surface along the (111) crystal plane using the second $SiO_2$ mask so as to form a through-hole pattern in the substrate; (ix) forming a metallic layer on the substrate in an area defined by the first $SiO_2$ mask; and (x) removing the $SiO_2$ to form the fiducial mark;

(b) positioning the fiducial mark in an x-y plane;

(c) scanning the fiducial mark with a charged particle beam propagating in a z direction so as to cause charged particles to be reflected from the fiducial mark; and (d) detecting the reflected charged particles.

14. The method of claim 13, wherein the P-type layer in step (ii) comprises a 1-$\mu$m thick boron-diffused layer.

15. The method of claim 13, wherein the resist pattern in step (vi) comprises a first mark and a second mark each comprising multiple rectangles at a selected pitch, the rectangles of the first mark being longitudinally oriented perpendicularly to the rectangles of the second mark.

16. The method of claim 15, wherein the resist pattern in step (vi) is sized so as to compensate for an approximately 55-degree taper angle formed during anisotropically etching the (100) crystal plane surface along the (111) crystal plane.

17. A fiducial mark, comprising:

(a) a first monocrystalline silicon substrate defining a (110) crystal plane, a (111) crystal plane, and a [112]

orientation of the (110) crystal plane, the first substrate comprising a major surface in the (110) plane and a first mark on the first major surface;

(b) a second monocrystalline silicon substrate defining a (110) crystal plane, a (111) crystal plane, and a [112] orientation of the (110) crystal plane, the second substrate comprising a major surface in the (110) plane and a second mark on the major surface;

(c) the first mark comprising a pattern of multiple longitudinally extended cavities on the major surface of the first substrate, the cavities (i) extending lengthwise in a y direction parallel to the [112] orientation of the first substrate, (ii) being arranged at a pitch in an x direction, and (iii) having longitudinal walls in the (111) plane;

(d) the second mark comprising a pattern of multiple longitudinally extended cavities on the major surface of the second substrate, the cavities (i) extending lengthwise in the x direction parallel to the [112] orientation of the second substrate, (ii) being arranged at a pitch in the y direction, and (iii) having longitudinal walls in the (111) plane; and (e) the first and second substrates being situated superposedly with respect to each other such that the first mark is perpendicular to the second mark but does not overlap the second mark.

18. A charged-particle-beam exposure apparatus, comprising:

(a) a first charged-particle-beam optical system for directing a charged-particle beam from a source to a mask subfield on a mask;

(b) the fiducial mark of claim 17;

(c) a second charged-particle-beam optical system for directing the charged-particle beam from the mask subfield on the mask to the fiducial mark; and (d) a charged-particle detector situated so as to detect charged particles from the beam that interact with the fiducial mark.

19. The fiducial mark of claim 17, wherein the major surface of each of the first and second substrates comprises a layer of a metal.

20. A fiducial mark, comprising:

(a) a monocrystalline silicon substrate defining a (100) crystal plane and a (111) crystal plane, the substrate comprising a major surface in the (100) plane and first and second marks on the major surface;

(b) the first mark comprising a pattern of multiple longitudinally extended cavities on the major surface of the substrate, the cavities (i) extending lengthwise in a y direction on the major surface, (ii) being arranged at a pitch in an x direction on the major surface, and (iii) having longitudinal walls;

(c) the second mark comprising a pattern of multiple longitudinally extended cavities on the major surface of the substrate, the cavities (i) extending lengthwise in the x direction on the major surface, (ii) being arranged at a pitch in the y direction on the major surface, and (iii) having longitudinal walls in the (111) plane; and (d) the first and second marks being situated separately from each other on the major surface.

21. A charged-particle-beam exposure apparatus, comprising:

(a) a first charged-particle-beam optical system for directing a charged-particle beam from a source to a mask subfield on a mask;

(b) the fiducial mark of claim 20;

(c) a second charged-particle-beam optical system for directing the charged-particle beam from the mask subfield on the mask to the fiducial mark; and (d) a charged-particle detector situated so as to detect charged particles from the beam that interact with the fiducial mark.

22. The fiducial mark of claim 20, wherein the major surface comprises a metal layer that extends along the walls of the cavities of the first and second marks.

* * * * *

UNITED STATES PATENT AND TRADEMARK OFFICE
CERTIFICATE OF CORRECTION

PATENT NO. : 6,059,981
DATED : May 9, 2000
INVENTOR(S) : Mamoru Nakasuji

It is certified that error appears in the above-identified patent and that said Letters Patent is hereby corrected as shown below:

In Column 7, line 25, "upon on the" should read --upon the--.

In Column 10, line 41, "(112)" should read --[112]--.

Signed and Sealed this

Twenty-second Day of May, 2001

Attest:

NICHOLAS P. GODICI

Attesting Officer     Acting Director of the United States Patent and Trademark Office